(12) United States Patent
Wang et al.

(10) Patent No.: US 11,740,545 B2
(45) Date of Patent: Aug. 29, 2023

(54) CURVED SCREEN AND METHOD OF ARRANGING MICROSTRUCTURE THEREIN, AND PROJECTION SYSTEM

(71) Applicant: Appotronics Corporation Limited, Shenzhen (CN)

(72) Inventors: Lin Wang, Shenzhen (CN); Fei Hu, Shenzhen (CN); Yi Li, Shenzhen (CN)

(73) Assignee: Appotronics Corporation Limited, Shenzhen (CN)

( * ) Notice: Subject to any disclaimer, the term of this patent is extended or adjusted under 35 U.S.C. 154(b) by 451 days.

(21) Appl. No.: 17/040,122

(22) PCT Filed: Dec. 3, 2018

(86) PCT No.: PCT/CN2018/118835
§ 371 (c)(1),
(2) Date: Sep. 22, 2020

(87) PCT Pub. No.: WO2019/179167
PCT Pub. Date: Sep. 26, 2019

(65) Prior Publication Data
US 2021/0026231 A1 Jan. 28, 2021

(30) Foreign Application Priority Data
Mar. 22, 2018 (CN) .......................... 201810238977.5

(51) Int. Cl.
*G03B 21/60* (2014.01)
*G02B 5/00* (2006.01)
(Continued)

(52) U.S. Cl.
CPC ........... *G03B 21/60* (2013.01); *G02B 3/0037* (2013.01); *G02B 5/003* (2013.01); *G02B 5/0226* (2013.01); *G02B 5/045* (2013.01); *G03B 21/602* (2013.01)

(58) Field of Classification Search
CPC ...... G03B 21/60; G03B 21/56; G03B 21/602; G02B 5/045; G02B 5/0226; G02B 5/136
(Continued)

(56) References Cited

U.S. PATENT DOCUMENTS 5,903,392 A * 5/1999 Kojima ................ G02B 5/0226
359/834
2004/0125345 A1 7/2004 Kim et al.
(Continued)

FOREIGN PATENT DOCUMENTS

CN 1512263 A 7/2004
CN 1734290 A 2/2006
(Continued)

*Primary Examiner* — Christopher E Mahoney
(74) *Attorney, Agent, or Firm* — ScienBiziP, P.C.

(57) ABSTRACT

A curved screen comprises the following layers sequentially arranged from inside to outside: a black light-absorbing layer, a microstructure array layer, and a transparent matrix layer. The microstructure array layer consists of a plurality of microstructure units. The microstructure unit is a V-shaped recess consisting of two intersecting inclined surfaces. The microstructure array layer is rotationally symmetrical with respect to a center line of the curved screen. Angles of the V-shaped recesses in respective longitudinal cross sections of the curved screen are uniquely determined according to incident angles of light rays from a projector. Also disclosed are a method of arranging microstructures in the curved screen and a projection system comprising the curved screen. The curved screen has a higher contrast, improved brightness uniformity and an enlarged field of view.

19 Claims, 6 Drawing Sheets

(51) Int. Cl.
   *G03B 21/602*   (2014.01)
   *G02B 3/00*     (2006.01)
   *G02B 5/02*     (2006.01)
   *G02B 5/04*     (2006.01)

(58) Field of Classification Search
   USPC ......................................................... 359/451
   See application file for complete search history.

(56) References Cited

U.S. PATENT DOCUMENTS

2005/0275952 A1    12/2005  Odagiri et al.
2016/0334697 A1*   11/2016  Kim ........................ G02B 1/041
2019/0354002 A1*   11/2019  Hu ......................... G03B 21/604

FOREIGN PATENT DOCUMENTS

| CN | 104298063  A |   | 1/2015  |             |
| CN | 108073029  A | * | 5/2018  | ............ G03B 21/60 |
| JP | 56165130   A | * | 12/1981 | ........... G03B 21/602 |
| JP | 2014199375 A |   | 10/2014 |             |

\* cited by examiner

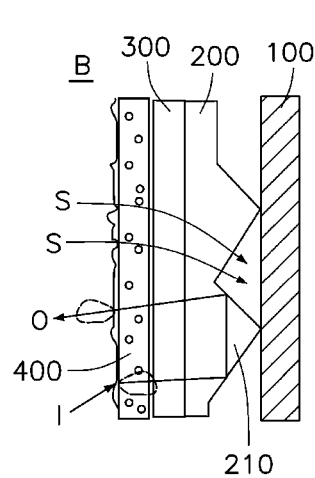
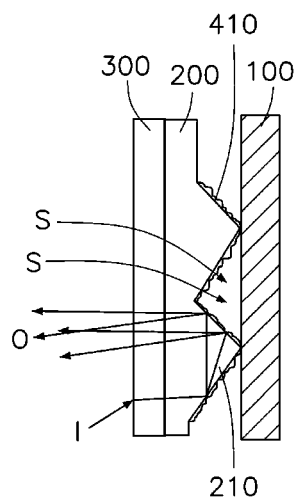
FIG. 1   FIG. 2
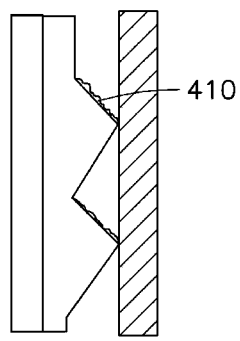
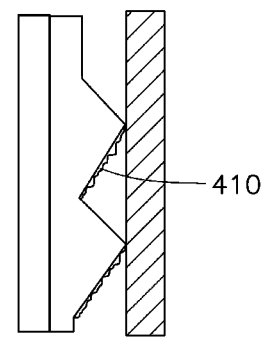
FIG. 3   FIG. 4

CURVED SCREEN AND METHOD OF ARRANGING MICROSTRUCTURE THEREIN, AND PROJECTION SYSTEM

TECHNICAL FIELD

The present disclosure relates to a curved screen and a method for arranging microstructures thereof and a projection system, and relates to a technical field of optical component manufacturing.

BACKGROUND

With continuous improvement of projector brightness, the advantages of projection display system in large-size home theater applications begin to manifest. Comparing with LCD televisions, the projection display system is small in size, easy to install, and the whole system has a low price, and the screen sizes can easily be larger than 100 inches. Curved display technology has attracted much attention because it provides a more comfortable viewing experience and an immersive surround effect to the consumers. However, compared with a traditional flat display system, the curved display has obvious technical advantages. The arc-shaped curved surface is more in line with the structure of the human eye from an ergonomic point of view, ensuring that a distance from each point on the screen to the eyeball is equal, reducing visual distortion and making the audience more comfortable to watch; at the same time, the curved display can expand viewing field of the picture, reduce edge loss, and enhance the audience's sense of immersion and presence. In addition, for the large incident angle of the ultra-short focal projector to the screen, the curved screen reduces the incident angle at the edge of the screen by bending, thereby reducing the Fresnel reflection on the screen surface and further improving uniformity of screen brightness.

SUMMARY

The technical problem to be solved by the present disclosure is to provide a curved screen and its microstructure arranging method and a projection system in view of the deficiencies of the prior art. The structure of the diffusion layer is diverse; by arranging angles of the total reflection diffusion layer, not only incident light of the projector and ambient stray light are effectively distinguished from each other, the contrast of the screen is improved, but also light is reflected into the viewer's viewing field at a certain scattering angle, the viewing field is increased; the brightness uniformity of the curved screen is improved; the gain is increased and easy to install.

The technical problem to be solved by the present disclosure is achieved through the following technical solutions:

A curved screen comprises a black light-absorbing layer, a microstructure array layer, and a transparent substrate layer arranged sequentially from inside to outside; the microstructure array layer comprises a plurality of microstructure units; the microstructure unit is a V-shaped recess formed of two intersecting inclined planes; the microstructure array layer is rotationally symmetrical with respect to a center line of the curved screen; an angle of the V-shaped recess on each cross-section of the curved screen in a longitudinal direction is uniquely determined based on an angle of the incident light from a projector.

In order to further spread the light, the curved screen further comprises a light diffusion layer; in different situations, arrangement of the light diffusion layer can also be different. In one embodiment of this disclosure, the light diffusion layer is disposed on an outer side of the transparent substrate layer. In another embodiment of this disclosure, for easier processing and lower cost, the light diffusion layer may be composed of scattering material arranged on at least one inclined plane of the V-shaped recess.

In order to make more incident light meet conditions of total reflection and be used, improve utilization of the projector's light by the screen, the microstructure array layer further comprises a microstructure array and a microlens array, numbers and positions of the microstructure array and the microlens array are correspondingly arranged. Specifically, according to different processing methods, the microstructure array layer can be made into a variety of structures, such as: the microstructure array and the microlens array may be jointly arranged on two side surfaces of a first substrate; the microstructure array and the microlens array may be disposed on a first substrate and a second substrate, respectively; the first substrate and the second substrate can be processed in different ways of spacing apart from each other or attaching together.

Since the microstructure array is arranged in a rotationally symmetrical manner, and the rotation center axis is in a direction perpendicular to the microstructure array, the microlens array is an arc-shaped array comprising a plurality of lens units, and adopts an arc-shaped rotationally symmetric structure.

The present disclosure also provides a method for arranging microstructures in a curved screen, which includes the following steps:

Step 100: selecting an angle arranging position of the microstructure at any point on the curved screen;

Step 200: calculating an angle $\psi$ between incident light at the position and a cross-section of the microstructure at the position;

Step 300: projecting the incident light and emitted light onto the cross-section of the microstructure to obtain direction angles $\alpha'$ and $\beta'$;

Step 400: calculating angles $\theta_1$ and $\theta_2$ of a cross-section of a V-shaped recess based on directions of the incident light and the emitted light on a projection cross-section.

A specific calculation method in the step 300 comprises formulas (1) and (2):

$$\cos(\alpha) = \cos(\psi)\cos(\alpha') \qquad (1)$$

$$\cos(\theta_2 + \beta') < \sqrt{1 - \left(\frac{n_3}{n_2}\right)^2} \cos(\beta) = \cos(\psi)\cos(\beta'); \qquad (2)$$

wherein $\alpha$ is an angle between the incident light and a normal direction of the screen surface; $\beta$ is an angle between the emitted light and the normal direction of the screen surface; $\psi$ is an angle between the incident light and the cross-section of the microstructure; $\alpha'$ is an angle between projected incident light and the normal direction of the screen surface; $\beta'$ is an angle between projected emitted light and the normal direction of the screen surface; n2 is a refractive index of the microstructure unit; n3 is a refractive index of a substance, which generally is air, in contact with the microstructure unit.

A specific calculation method in the step 400 comprises formulas (3) to (5):

$$\theta_1 + \theta_2 = \frac{180° - (\alpha' + \beta')}{2} \quad (3)$$

$$\cos(\theta_1 + \alpha') < \sqrt{1 - \left(\frac{n_3}{n_2}\right)^2} \quad (4)$$

$$\cos(\theta_2 + \beta') < \sqrt{1 - \left(\frac{n_3}{n_2}\right)^2}; \quad (5)$$

wherein $\theta_1$ is an angle between a first incident inclined plane and a direction parallel to the screen; $\theta_2$ is an angle between the first incident inclined plane and a direction parallel to the screen.

The present disclosure also provides a projection system comprising a projector and a projection screen, the projection screen is the above-described curved screen.

In summary, the present disclosure provides a curved screen and its microstructure arranging method and a projection system. The structure of the diffusion layer is diverse; by arranging angles of the total reflection diffusion layer, not only the incident light of the projector and the ambient stray light are effectively distinguished from each other, the contrast of the screen is improved, but also light is reflected into the viewer's viewing field at a certain scattering angle, the viewing field is increased; the brightness uniformity of the curved screen is improved; the gain is increased and easy to install.

The technical solution of the present disclosure will be described in detail below with reference to the drawings and specific embodiments.

BRIEF DESCRIPTION OF TUE DRAWINGS

FIG. 1 is a cross-sectional view of a curved screen along a center line of a first embodiment of the present disclosure.

FIG. 2 is a cross-sectional view of a curved screen along a center line of a second embodiment of the present disclosure.

FIG. 3 is a schematic view showing arranging position of scattering material of a third embodiment of the present disclosure.

FIG. 4 is a schematic view showing arranging position of scattering material of a fourth embodiment of the present disclosure.

DETAILED DESCRIPTION

First Embodiment

Figure 5:
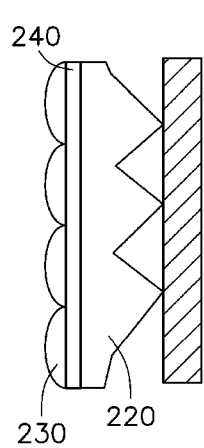
FIG. 5 is a schematic view of a microstructure array layer according to a fifth embodiment of the present disclosure.

FIG. 1 is a cross-sectional view of a curved screen along a center line of a first embodiment of the present disclosure. As shown in FIG. 1, the present disclosure provides a curved screen B, which includes a black light-absorbing layer 100, a microstructure array layer 200, and a transparent substrate layer 300 arranged sequentially from inside to outside. The microstructure array layer 200 includes a plurality of microstructure units. The microstructure unit is a V-shaped recess 210 formed of two intersecting inclined planes. The microstructure array layer is rotationally symmetrical with respect to the center line of the curved screen. The angle of the V-shaped recess on each cross-section in a longitudinal direction of the curved screen is uniquely determined according to the angle of the incident light from the projector. In order to further disperse the light, the curved screen further includes a light diffusion layer 400. In different situations, the arrangement of the light diffusion layer may also be different. In this embodiment, the light diffusion layer 400 is positioned outside of the transparent substrate layer 300. The incident light I passes through the light diffusion layer 400 and forms emitted light O under influence of the microstructure unit, while the ambient light S is absorbed by the black light-absorbing layer 100.

Second Embodiment

FIG. 2 is a cross-sectional view of a curved screen along a center line of a second embodiment of the present disclosure. As shown in FIG. 2, in this embodiment, in order to facilitate processing and reduce cost, the light diffusion layer 410 is made of scattering material arranged on at least one inclined plane of the V-shaped recess. The scattering material can be obtained by sandblasting on the V-shaped recess; it can also be formed by roughening the mold surface to form a glue transfer structure; it can also be sprayed with glue having scattering particles when the surface of the microstructure unit is smoothed, and the arranging of the scattering material is, completed. In the embodiment shown in FIG. 2, the scattering material is arranged on the two inclined planes of the V-shaped recess. The incident light I passes through the transparent substrate layer 300 and forms emitted light O under influence of the light diffusion layer 410 disposed on the V-shaped recess 210, while the ambient light S is absorbed by the black light-absorbing layer 100. By arranging the light diffusion layer 410 structure on the V-shaped recess, the screen of the present disclosure does not need to additionally provide a separate light diffusion layer on the surface of the screen like the screen in the first embodiment, but enables the microstructure unit to have a light diffusion function. Therefore, the structure of the screen is simplified, the cost is reduced, and the yield is improved.

Third Embodiment

FIG. 3 is a schematic view showing arranging position of scattering material of a third embodiment of the present disclosure. As shown in FIG. 3, in this embodiment, the arranging position of the scattering material is different from that of the second embodiment. Specifically, the scattering material is disposed on the upper side inclined plane of the V-shaped recess to form the light diffusion layer 410. In practical applications, no matter where the scattering material is placed in the V-shaped recess, it can have a scattering effect, and it will not affect the scattering effect. It can make the microstructure unit to have a light diffusion function and will not affect the light diffusion effect. The difference is only slightly different due to the different arranging positions during the processing.

Fourth Embodiment

FIG. 4 is a schematic view showing arranging, position of scattering material of a fourth embodiment of the present disclosure. As shown in FIG. 4, in this embodiment, the scattering material is arranged on the lower side inclined plane of the V-shaped recess to form the light diffusion layer 410. Compared with the second embodiment, both the third and fourth embodiments only provide the scattering material on one side inclined plane of the V-shaped recess. The processing technology is simpler than that of the second embodiment the material is saved to a certain extent, the cost is reduced, but the scattering effect will not be greatly affected. Therefore, in practical applications, the location and manner of the scattering material can be selected according to different requirements for scattering effects or processing costs.

Fifth Embodiment

In order to make more incident light to meet the conditions of total reflection and be utilized, improve utilization of the projector light by the screen, so that the optical path of the projection light originally incident at a large incident angle becomes easier to meet the total reflection in the microstructure array; the projection light can be totally reflected through the two intersecting inclined planes of the V-shaped recess in turn, which greatly reduces loss of the projection light caused by inability to produce total reflection, improves the utilization of the projection light, improves the screen gain, and obtain brighter display image. The microstructure array layer further includes a microstructure array and a microlens array, numbers and positions of the microstructure array and the microlens array are correspondingly arranged. Specifically, according to different processing methods, the microstructure array layer can be made into a variety of structures. FIG. 5 is a schematic view of a microstructure array layer according to a fifth embodiment of the present disclosure. As shown in FIG. 5, the microstructure array 220 and the microlens array 230 are jointly arranged on two side surfaces of a first substrate 240, wherein the first substrate 240 is PET (polyethylene terephthalate), a side of the PET facing the audience is processed with the microlens array 230, and on the other side, the microstructure arrays 220 with a row of V-shaped recesses are processed by coating resin using a pair of rolls and curing by ultraviolet.

Sixth Embodiment

Figure 6:
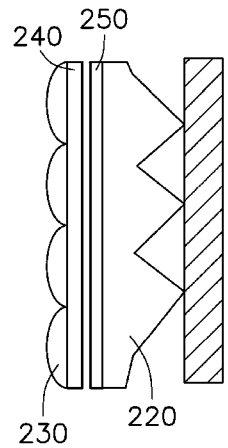
FIG. 6 is a schematic view of a microstructure array layer according to a sixth embodiment of the present disclosure.

FIG. 6 is a schematic view of a microstructure array layer according to a sixth embodiment of the present disclosure. As shown in FIG. 6, in this embodiment, the microstructure array 220 and the microlens array 230 are disposed on a first substrate 240 and a second substrate 250, respectively. The materials of the first substrate 240 and the second substrate 250 are substantially the same, and beneficial effects that can be achieved are also the same as those of the fifth embodiment, the first substrate and the second substrate are distinguished in names only because the microstructure array 220 and the microlens array 230 are provided on them, respectively. In the embodiment shown in FIG. 6, the first substrate 240 and the second substrate 250 are spaced apart from each other.

Seventh Embodiment

Figure 7:
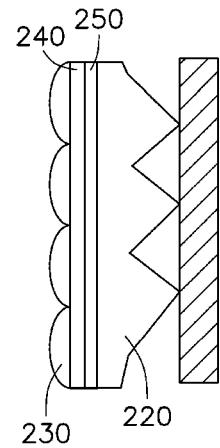
FIG. 7 is a schematic view of a microstructure array layer according to a seventh embodiment of the present disclosure.

FIG. 7 is a schematic view of a microstructure array layer according to a seventh embodiment of the present disclosure. As shown in FIG. 7, in this embodiment, the microstructure array 220 and the microlens array 230 are also respectively disposed on the first substrate 240 and the second substrate 250. The difference from the sixth embodiment is that the first substrate 240 and the second substrate 250 are attached together in order to save space, and beneficial effects that can be achieved are the same as those of the fifth embodiment and the sixth embodiment.

Figure 8:
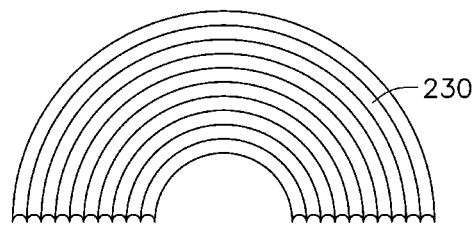
FIG. 8 is a schematic view of microlens array of the present disclosure.

FIG. 8 is a schematic view of microlens array of the present disclosure. As shown in FIG. 8, since the microstructure array 220 is arranged in a rotationally symmetric manner, and a rotation center axis is located in a direction perpendicular to the microstructure array, the microlens array 230 is also an arc-shaped array composed of a plurality of lens units, and adopts an arc-shaped rotationally symmetric structure.

Figure 9:
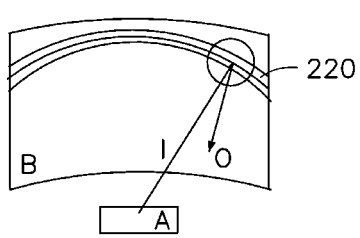
FIG. 9 is a schematic view of an overall structure of the curved screen of the present disclosure.
Figure 10:
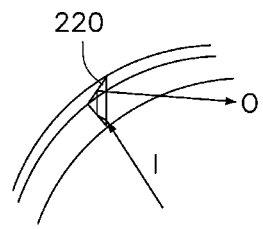
FIG. 10 is cross-sectional view of a partial structure of the microstructure cross-section of the present disclosure.

FIG. 9 is a schematic view of an overall structure of the curved screen of the present disclosure; FIG. 10 is cross-sectional view of a partial structure of the microstructure cross-section of the present disclosure. As shown in FIG. 9 in combination with FIG. 10, when the screen is flat, due to rotational symmetry of the microstructure array 220, the focus of the edge screen will deviate from a center of the viewing field, causing the edge brightness to be significantly lower than the brightness in the center of the screen. The curved screen B is beneficial to improve the brightness uniformity of the screen surface. Although the microstructures of the flat screen and the curved screen both perform two total reflections of incident light I for light collimation, the curved radius of curvature of the curved screen provides more arranging freedom and can be used to optimize the configuration of the microstructure cross-section to improve the brightness uniformity of the screen surface.

Figure 11:
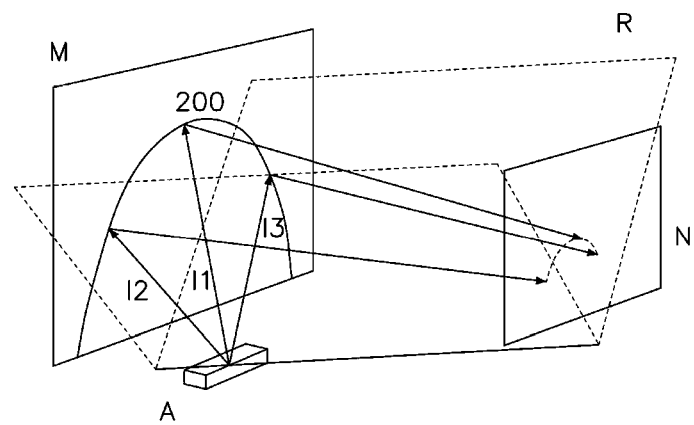
FIG. 11 and FIG. 12 are light paths on a flat projection screen and a curved projection screen, respectively.
Figure 12:
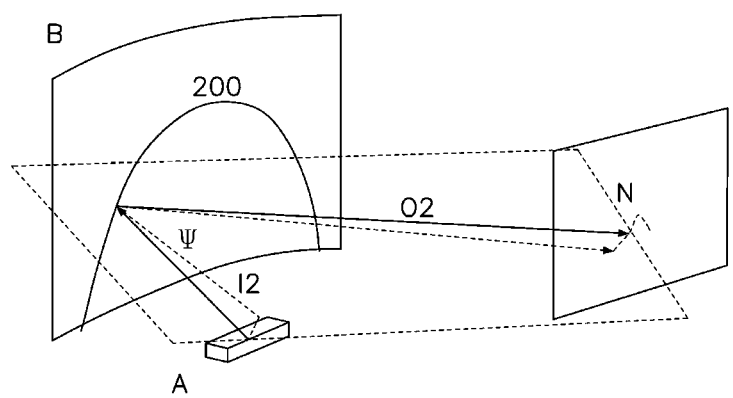
Figure 13:
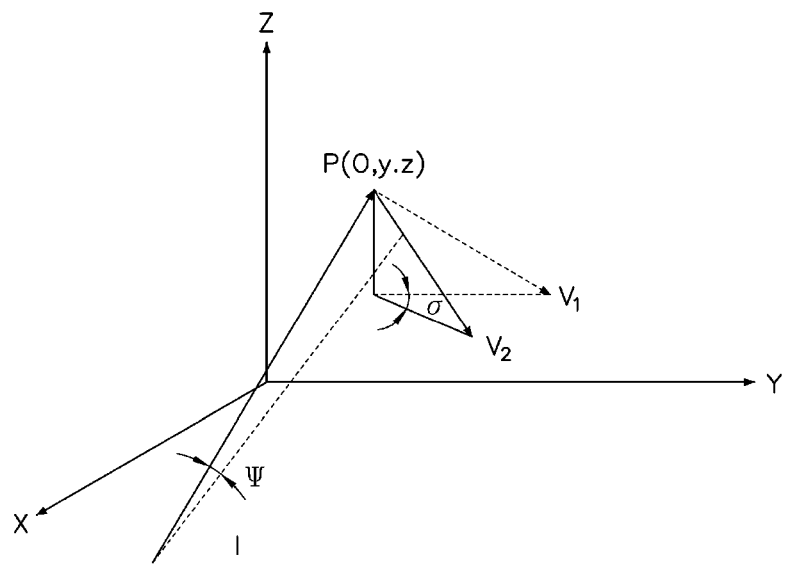
FIG. 13 is a schematic view showing direction variation of a V-shaped recess bus bar at point P in the curved screen.
Figure 14:
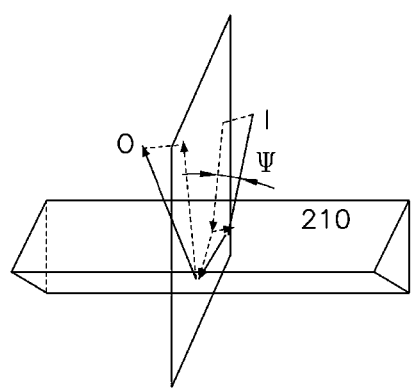
FIG. 14 is a schematic view showing positional relationship between a cross-section of the microstructure of the present disclosure and incident light and emitted light.
Figure 15:
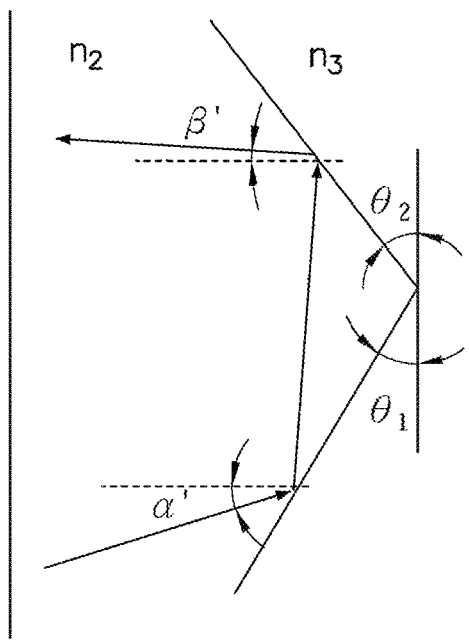
FIG. 15 is a schematic view of an optical reflection principles of the microstructure of the present disclosure.

FIG. 11 and FIG. 12 are light paths on a flat projection screen and a curved projection screen, respectively; FIG. 13 is a schematic view showing direction variation of a V-shaped recess bus bar at point P in the curved screen; FIG. 14 is a schematic view showing positional relationship between a cross-section of the microstructure of the present disclosure and incident light and emitted light; FIG. 15 is a schematic view of optical reflection principles of the microstructure of the present disclosure. As shown in FIG. 11, the flat screen M has a rotationally symmetrical microstructure 200, and the rotation axis passes through the ultrashort throw projector A. Therefore, the incident light I and the emitted light O are located in the microstructure cross-section 212 perpendicular to the recess bus bar 211. The incident lights I1, I2 and I3 represent incident lights with different emitting angles on the same rotating V-shaped recess, respectively. The light I1 is located on an incident cross-section through the center of the screen, while the light I2 and I3 are located on the rotating cross-section. Due to the rotational symmetry of the screen microstructure 200, the lights I1, I2, and I3 are emitted to different positions in the viewer's viewing field. The light I1 passes through the center of the viewing field, while the lights I2 and I3 deviate from the center of the viewing field. According to the above analysis of the light path, the difference in the intersection positions of the light and the viewing field can cause uneven distribution of the screen brightness seen in the viewing field.

As shown in combination with FIG. 12, when the screen is bent to the audience side, the microstructure cross-section 200 will shift to the center of the viewing field, so the incident light I and the microstructure cross-section 200 will form an angle, so that the emitted light O shift to the center of the viewing field. When the bending radius of the curved surface is known, the angle $\psi$ between the incident light I and the cross-section of the microstructure perpendicular to the bus bar can be calculated theoretically.

Specifically, in combination with FIG. 13, assuming that the flat screen is located in the y-z plane, a position of a point P on the screen is (0, y, z) and a direction of the V-shaped recess bus bar passing through this point is V1. When the screen is bent into a curved surface, the bus bar direction of this point will also rotate accordingly. For example, when the screen is horizontally bent by angle σ, the bus bar direction V2 after bending is V1 rotated by angle σ around the z axis. The angle $\psi$ is the angle between the incident light and the straight line projected on the plane of the vertical bus bar V2.

For the convenience of description, the cross-sections of the microstructures described in the present disclosure are all perpendicular to the bus bar direction of the microstructures. For a screen having a size larger than 100 inches, a distance between the microstructures on the cross-section is about 50 to 300 microns, and the microstructures can be approximately regarded as a linear prism structure, as shown in FIG. 14. According to a principle of geometric optics, the linear prism structure has a characteristic of keeping the light component of the incident light having a certain angle with the microstructure cross-section along the bus bar direction unchanged. Using this characteristic, the angles of the projected emitted light, can be set on the microstructure cross-section, so that the actual emitted light is as close as possible to the center of the viewing field, as shown in FIG. 15.

Figure 16:
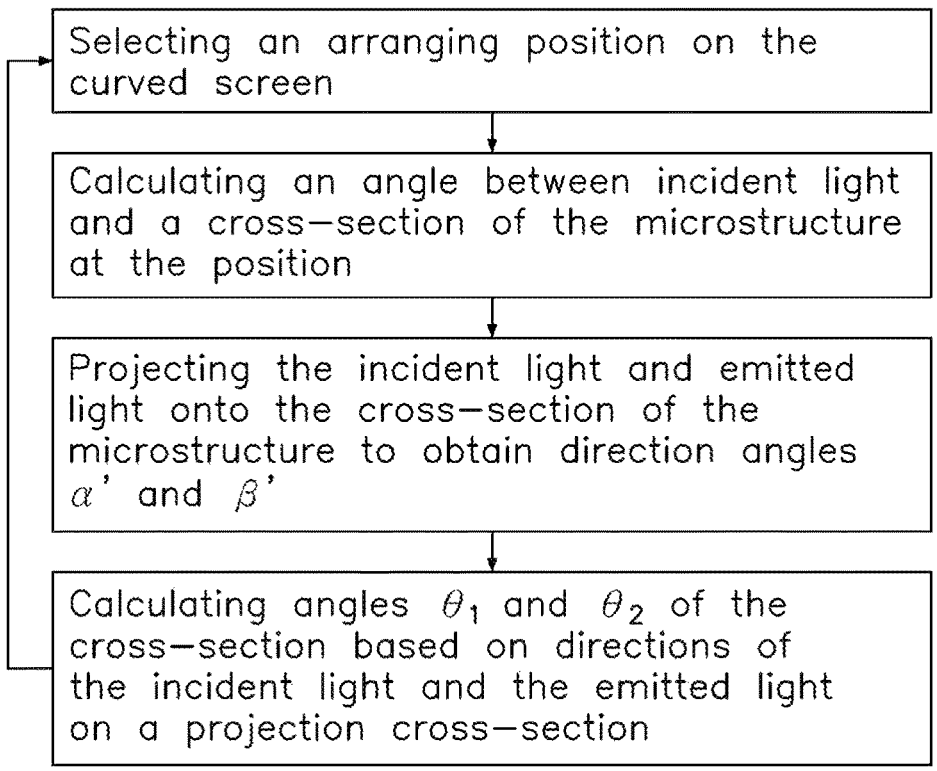
FIG. 16 is a flow chart of a method of arranging microstructures of the present disclosure.

FIG. 16 is a flow chart of a method for arranging the microstructures of the present disclosure. As shown in FIG. 16, according to the above analysis, the angle of the microstructure on the curved screen can be set through the following simple steps. Specifically, it includes the following steps:

Step 100: selecting an angle arranging position of the microstructure at any point on the curved screen;

Step 200: calculating an angle $\psi$ between incident light at the position and a cross-section of the microstructure at the position;

Step 300: projecting, the incident light and emitted light onto the cross-section of the microstructure to obtain direction angles $\alpha'$ and $\beta'$;

Step 400: calculating angles $\theta_1$ and $\theta_2$ of a cross-section of a V-shaped recess based on directions of the incident light and the emitted light on a projection cross-section.

The specific calculation method in the step 300 includes: formulas (1) and (2):

$$\cos(\alpha) = \cos(\psi)\cos(\alpha') \quad (1)$$

$$\cos(\theta_2 + \beta') < \sqrt{1 - \left(\frac{n_3}{n_2}\right)^2} \cos(\beta) = \cos(\psi)\cos(\beta') \quad (2)$$

wherein α is an angle between the incident light and the normal direction of the screen surface;

β is an angle between the emitted light and the normal direction of the screen surface;

$\psi$ is an angle between the incident light and the cross-section of the microstructure;

α' is an angle between projected incident light and the normal direction of the screen surface;

β' is an angle between projected emitted light and the normal direction of the screen surface;

n2 is a refractive index of the microstructure unit;

n3 is a refractive index of a substance, which generally is air, in contact with the microstructure unit.

The specific calculation method in step 400 includes: formulas (3) to (5):

$$\theta_1 + \theta_2 = \frac{180° - (\alpha' + \beta')}{2} \quad (3)$$

$$\cos(\theta_1 + \alpha') < \sqrt{1 - \left(\frac{n_3}{n_2}\right)^2} \quad (4)$$

$$\cos(\theta_2 + \beta') < \sqrt{1 - \left(\frac{n_3}{n_2}\right)^2}. \quad (5)$$

wherein $\theta_1$ is an angle between the first incident inclined plane and a direction parallel to the screen;

$\theta_2$ is an angle between a second incident inclined plane and a direction parallel to the screen;

In the present disclosure, the angle of the V-shaped recess is obtained by the above calculation method. For a curved screen, each V-shaped recess is uniquely determined by a cross-section. However, the angle between the cross-section of the V-shaped recess and the incident light from the projector gradually changes, increasing from the center of the screen to both sides of the screen. Reasonable selection of the above angle to determine the cross-sectional shape of the V-shaped recess can increase the overall brightness uniformity of the screen.

Figure 17:
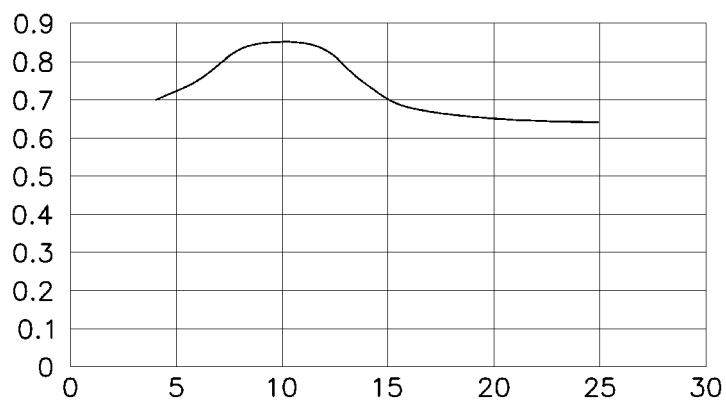
FIG. 17 is a schematic view showing relationship between brightness uniformity and screen curvature radius, in the present disclosure.

FIG. 17 is a schematic view showing relationship between brightness uniformity and screen curvature radius in the present disclosure. As shown in FIG. 17, it can be seen that for a curved screen, selection of the bending radius needs to be optimized according to a distance of the viewer relative to the screen and a size of the screen. The abscissa in FIG. 17 represents the curvature radius of the curved screen, and the ordinate represents the brightness uniformity of the curved screen. Compared with self-luminous LED, OLED or LCD televisions, the light source of laser television comes from a bottom of the curved screen, and it is reflected into the viewer's viewing field after two total reflections. Therefore, the selection of curvature of the screen for the laser television is different.

For example, for a curved screen with a diagonal size ranging from 100 inches to 120 inches, when the viewing distance is within a range of 3 meters to 4 meters, a comprehensive brightness uniformity evaluation index L can be obtained by simulating the brightness uniformity Li (i=1 . . . N) of the screen observed by different viewer positions, and performing weighted average.

$$L = \sqrt{\frac{\sum_{i=1}^{N} L_i^2}{N}} \quad (6)$$

wherein L is a comprehensive evaluation index of brightness uniformity;

Li is uniformity of screen brightness observed from different viewing positions;

N is a sum of viewing positions.

Through simulation, when the screen gain is 2.0 to 3.0, when the curvature radius of the screen is bent from 4 meters to 15 meters, the uniformity can be improved by more than 15% compared with the flat screen.

The present disclosure also provides a projection system including a projector and a projection screen, and the projection screen is the curved screen as described above.

In summary, the present disclosure provides a curved screen and its microstructure arranging method and a projection system. The cross-section of the curved screen is provided with a microstructure composed of V-shaped recesses. Considering influence of screen bending, by calculating inclination angle of the microstructure on the curved surface further increases the brightness and uniformity of the curved screen compared to a flat total reflection screen. The beneficial effects are:

1) The microstructure layer of the present disclosure can be combined with various diffusion layers, including; an independent diffusion layer or a diffusion layer formed by diffusion material provided on a surface of the microstructure.

2) By arranging the angle of the total reflection diffusion layer, the incident light of the projector can be distinguished from the stray light from the environment, the contrast of the screen can be improved, and light can be reflected into the viewer's viewing field at a certain scattering angle and the viewing angle is increased.

3) Compared with the arranging method of a flat screen, the present disclosure improves the brightness uniformity of the screen; the microstructure has rotational symmetry on the plane, the flexibility of the screen substrate is utilized to bend to a curvature radius, which is convenient for installation, increases gain, and ensures higher contrast at the same time. With the existing laser projector, it is expected to produce a low-cost, high-performance laser projection system, such as laser television.

What is claimed is:

1. A curved screen, comprising a black light-absorbing layer, a microstructure array layer, and a transparent substrate layer arranged sequentially from inside to outside, wherein the microstructure array layer comprises a plurality of microstructure units; the microstructure unit is a V-shaped recess formed of two intersecting inclined planes; the microstructure array layer is rotationally symmetrical with respect to a center line of the curved screen; and wherein an angle of the V-shaped recess on each cross-section of the curved screen in a longitudinal direction is uniquely determined based on an angle of incident light from a projector.

2. The curved screen of claim 1, further comprising a light diffusion layer disposed on an outer side of the transparent substrate layer.

3. The curved screen of claim 1, further comprising a light diffusion layer made of scattering material arranged on at least one inclined plane of the V-shaped recess.

4. The curved screen of claim 1, wherein the microstructure array layer further comprises a microstructure array and a microlens array, and wherein numbers and positions of the microstructure array and the microlens array are correspondingly arranged.

5. The curved screen of claim 4, wherein the microstructure array and the microlens array are arranged on two side surfaces of a first substrate, respectively.

6. The curved screen of claim 4, wherein the microstructure array and the microlens array are disposed on a first substrate and a second substrate, respectively.

7. The curved screen of claim 6, wherein the first substrate and the second substrate are spaced apart from each other or attached together.

8. The curved screen of claim 4, wherein the microlens array is an arc-shaped array comprising a plurality of lens units.

9. A method of arranging microstructures in a curved screen, comprising:

Step 100: selecting an angle arranging position of the microstructure at any point on the curved screen;

Step 200: calculating an angle $\psi$ between incident light at the position and a cross-section of the microstructure at the position;

Step 300: projecting the incident light and emitted light onto the cross-section of the microstructure to obtain direction angles $\alpha'$ and $\beta'$; and Step 400: calculating angles $\theta_1$ and $\theta_2$ of a cross-section of a V-shaped recess based on directions of the incident light and the emitted light on a projection cross-section;

wherein $\psi$ is an angle between the incident light and the cross-section of the microstructure; $\alpha'$ is an angle between projected incident light and the normal direction of the screen surface; $\beta'$ is an angle between projected emitted light and the normal direction of the screen surface; $\theta_1$ is an angle between a first incident inclined plane and a direction parallel to the screen; $\theta_2$ is an angle between a second incident inclined plane and a direction parallel to the screen.

10. The method of arranging microstructures in a curved screen of claim 9, wherein a specific calculation method in the step 300 comprises formulas (1) and (2):

$$\cos(\alpha) = \cos(\psi)\cos(\alpha') \quad (1)$$

$$\cos(\theta_2 + \beta') < \sqrt{1 - \left(\frac{n_3}{n_2}\right)^2} \cos(\beta) = \cos(\psi)\cos(\beta'); \quad (2)$$

wherein $\alpha$ is an angle between the incident light and a normal direction of the screen surface; $\beta$ is an angle between the emitted light and the normal direction of the screen surface; n2 is a refractive index of the microstructure unit; n3 is a refractive index of a substance, which generally is air, in contact with the microstructure unit.

11. The method of arranging microstructures in a curved screen of claim 9, wherein a specific calculation method in step 400 comprises formulas (3) to (5):

$$\theta_1 + \theta_2 = \frac{180° - (\alpha' + \beta')}{2} \quad (3)$$

$$\cos(\theta_1 + \alpha') < \sqrt{1 - \left(\frac{n_3}{n_2}\right)^2} \quad (4)$$

$$\cos(\theta_2 + \beta') < \sqrt{1 - \left(\frac{n_3}{n_2}\right)^2}. \quad (5)$$

12. A projection system, comprising a projector and a projection screen,
the projection screen being a curved screen and comprising a black light-absorbing layer, a microstructure array layer, and a transparent substrate layer arranged sequentially from inside to outside,
wherein the microstructure array layer comprises a plurality of microstructure units; the microstructure unit is a V-shaped recess formed of two intersecting inclined planes; the microstructure array layer is rotationally symmetrical with respect to a center line of the curved screen; and
wherein an angle of the V-shaped recess on each cross-section of the curved screen in a longitudinal direction is uniquely determined based on an angle of incident light from a projector.

13. The projection system of claim 12, wherein the projection screen further comprises a light diffusion layer disposed on an outer side of the transparent substrate layer.

14. The projection system of claim 12, wherein the projection screen further comprises a light diffusion layer made of scattering material arranged on at least one inclined plane of the V-shaped recess.

15. The projection system of claim 12, wherein the microstructure array layer further comprises a microstructure array and a microlens array, and wherein numbers and positions of the microstructure array and the microlens array are correspondingly arranged.

16. The projection system of claim 15, wherein the microstructure array and the microlens array are arranged on two side surfaces of a first substrate, respectively.

17. The projection system of claim 15, wherein the microstructure array and the microlens array are disposed on a first substrate and a second substrate, respectively.

18. The projection system of claim 17, wherein the first substrate and the second substrate are spaced apart from each other or attached together.

19. The projection system of claim 15, wherein the microlens array is an arc-shaped array comprising a plurality of lens units.

* * * * *